(12) United States Patent
Kuroishi et al.

(10) Patent No.: US 8,370,657 B2
(45) Date of Patent: Feb. 5, 2013

(54) INFORMATION PROCESSING APPARATUS, INFORMATION PROCESSING METHOD, AND COMPUTER READABLE MEDIUM

(75) Inventors: Kenji Kuroishi, Ebina (JP); Toshiharu Hayashida, Ebina (JP); Akiko Mochizuki, Ebina (JP); Seigo Makida, Ashigarakami-gun (JP); Yuji Murata, Ebina (JP); Shinho Ikeda, Ebina (JP); Tatsuyuki Tanaka, Ebina (JP); Mitsuharu Ohata, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 600 days.

(21) Appl. No.: 12/619,395

(22) Filed: Nov. 16, 2009

(65) Prior Publication Data
US 2010/0293400 A1 Nov. 18, 2010

(30) Foreign Application Priority Data

May 14, 2009 (JP) ................................. 2009-117532

(51) Int. Cl.
*G06F 1/26* (2006.01)
(52) U.S. Cl. ....... 713/310; 358/1.15; 358/1.16; 711/170
(58) Field of Classification Search ................. 358/1.15, 358/1.16; 711/170; 713/310
See application file for complete search history.

(56) References Cited

U.S. PATENT DOCUMENTS

| 7,057,754 | B1 | 6/2006 | Tsuchiya et al. |
| 7,265,866 | B2* | 9/2007 | Holmstead et al. .......... 358/1.16 |
| 2008/0313649 | A1* | 12/2008 | Tian .............................. 719/315 |

FOREIGN PATENT DOCUMENTS

| JP | 08-324071 A | 12/1996 |
| JP | 2001-180083 A | 7/2001 |

* cited by examiner

*Primary Examiner* — Albert Wang
(74) *Attorney, Agent, or Firm* — Sughrue Mion, PLLC

(57) ABSTRACT

An information processing apparatus includes a receiving unit that receives, from an external device via a communication line, a signal requesting provision of various types of services; a processing unit that when the receiving unit receives the signal in a setting period of a power saving state where power consumption is lower than in a running state, returns to the running state to process the signal and provide a service corresponding to the signal; and a memory that stores a content of the service provided by the processing unit and a content of a request requested by the signal, the content of the service and the content of the request being correlated respectively, wherein when the request received by the receiving unit in the setting period of the power saving state matches the content of the request stored in the memory, the processing unit reads the content of the service correlated with the content of the request from the memory and provides the service corresponding to the content of the service to the external device.

10 Claims, 7 Drawing Sheets

FIG.5

| No. | TYPE OF SERVICE | CONTENT OF SERVICE | RESPONSE CONTENT | ATTRIBUTE INFORMATION | | |
|---|---|---|---|---|---|---|
| | | | | DATE AND TIME | NUMBER OF TIMES TRANSMITTED | IP ADDRESS |
| 1 | SNMP | .1.3.6.1.4.1.253.3.7.7.7 | Info_1 | 09/2/23 16:56:23 | 2 | 192.164.21.23 |
| 2 | SNMP | .1.3.6.1.4.1.253.3.7.7.7 .1.3.6.1.4.1.253.3.8.8.8 .1.3.6.1.4.1.253.3.9.9.9 | Info_2 Info_3 Info_4 | 09/2/24 15:32:19 | 1 | 192.54.361.84 |
| 3 | SNMP | .1.3.6.1.4.1.253.3.1.1.1 .1.3.6.1.4.1.253.3.2.2.2 | Info_5 Info_6 | 09/2/25 11:45:03 | 8 | 192.421.63.17 |
| 4 | ... | ... | ... | ... | ... | ... |

INFORMATION PROCESSING APPARATUS, INFORMATION PROCESSING METHOD, AND COMPUTER READABLE MEDIUM

CROSS-REFERENCE TO RELATED APPLICATION

This application is based on and claims priority under 35 USC 119 from Japanese Patent Application No. 2009-117532 filed May 14, 2009.

BACKGROUND

1. Technical Field

The present invention relates to an information processing apparatus, an information processing method, and a computer readable medium.

2. Related Art

In information processing apparatus such as printers and copiers that receive and process information such as an image formation command from a communication line such as a network, ordinarily the apparatus transition to a power saving state that keeps power consumption low in accordance with the reception situation of the information such as the image formation command sent from the communication line, for example. Additionally, the information processing apparatus return from the power saving state by receiving information from the communication line.

SUMMARY

An information processing apparatus includes: a receiving unit that receives, from an external device via a communication line, a signal requesting provision of various types of services; a processing unit that when the receiving unit receives the signal in a setting period of a power saving state where power consumption is lower than in a running state, returns to the running state to process the signal and provide a service corresponding to the signal; and a memory that stores a content of the service provided by the processing unit and a content of a request requested by the signal, the content of the service and the content of the request being correlated respectively, wherein when the request received by the receiving unit in the setting period of the power saving state matches the content of the request stored in the memory, the processing unit reads the content of the service correlated with the content of the request from the memory and provides the service corresponding to the content of the service to the external device.

BRIEF DESCRIPTION OF THE DRAWINGS

An exemplary embodiment of the present invention will be described in detail below with reference to the drawings, wherein:

FIG. 5 is a diagram showing one example of a response information table relating to response packets that are stored in a RAM;

DETAILED DESCRIPTION

An exemplary embodiment of the present invention will be described in detail below with reference to the attached drawings.

Description of Image Forming System

Figure 1:
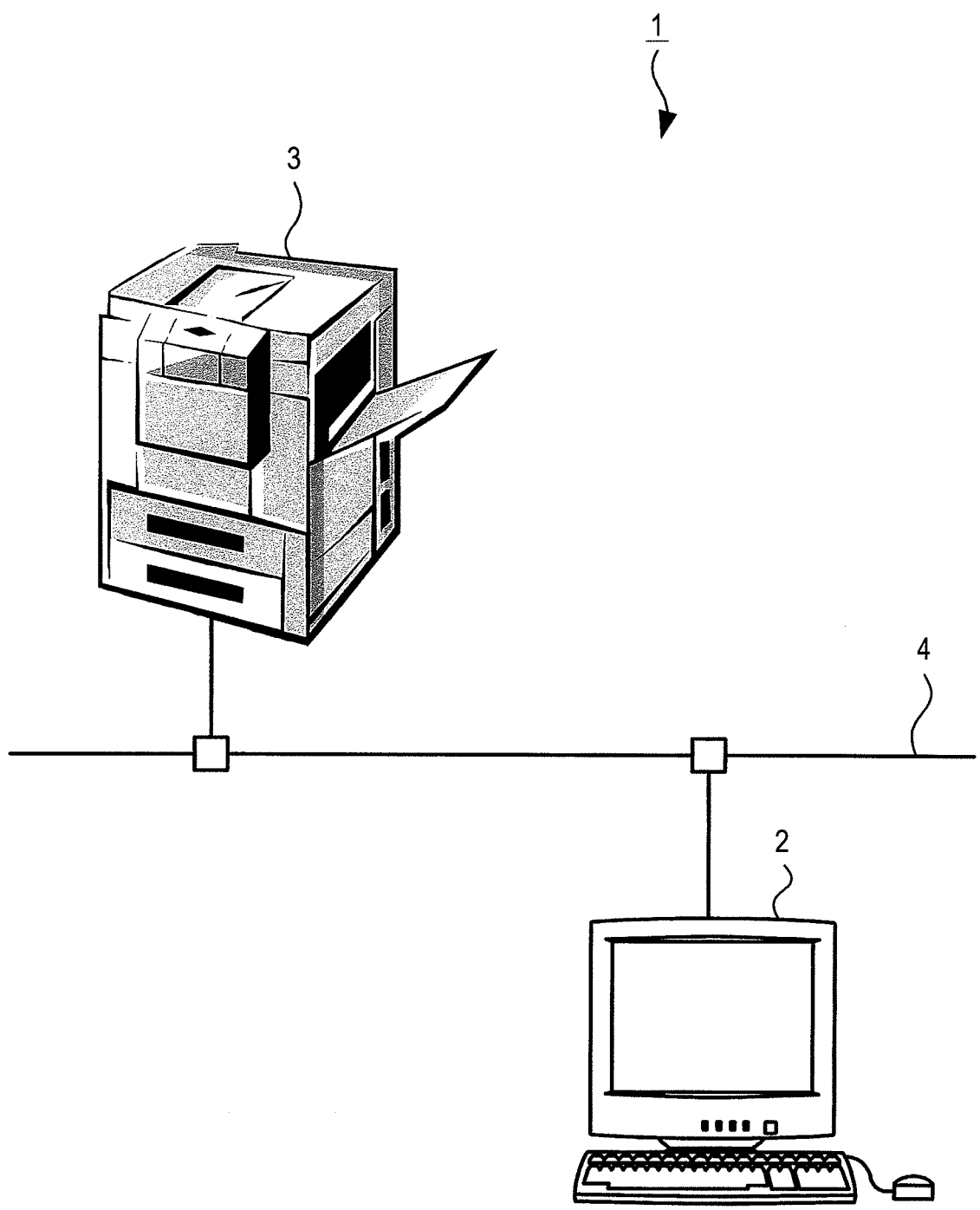
FIG. 1 is a diagram showing a configural example of an image forming system of the exemplary embodiment.

FIG. 1 is a diagram showing a configural example of an image forming system 1 of the present exemplary embodiment. In the image forming system 1 exemplified in FIG. 1, a terminal device 2 serving as one example of an external device that is installed in a work space (e.g., on a desk) of a user (operator, worker), for example, and an image forming apparatus 3 serving as one example of an information processing apparatus that processes a signal (information) such as an image formation command from the terminal device 2 and forms an image on a recording material on the basis of the image formation command, for example, are connected so as to be capable of communicating with each other via a network 4 serving as one example of a communication line such as a local area network (LAN), a wide area network (WAN) or the Internet. The communication line may also include a telephone line or a satellite communication link (e.g., a space transmission path in digital satellite broadcasting).

It will be noted that, ordinarily, a plurality of the terminal devices 2 and a plurality of the image forming apparatus 3 are connectable on the network 4, but FIG. 1 shows, as a part thereof, a functional portion where one terminal device 2 and one image forming apparatus 3 are connected.

Description of Terminal Device

First, the terminal device 2 will be described.

The terminal device 2 connected to the network 4 is configured by a personal computer (PC), for example, and creates and stores image data comprising documents, figures, graphics and photographs.

Figure 2:
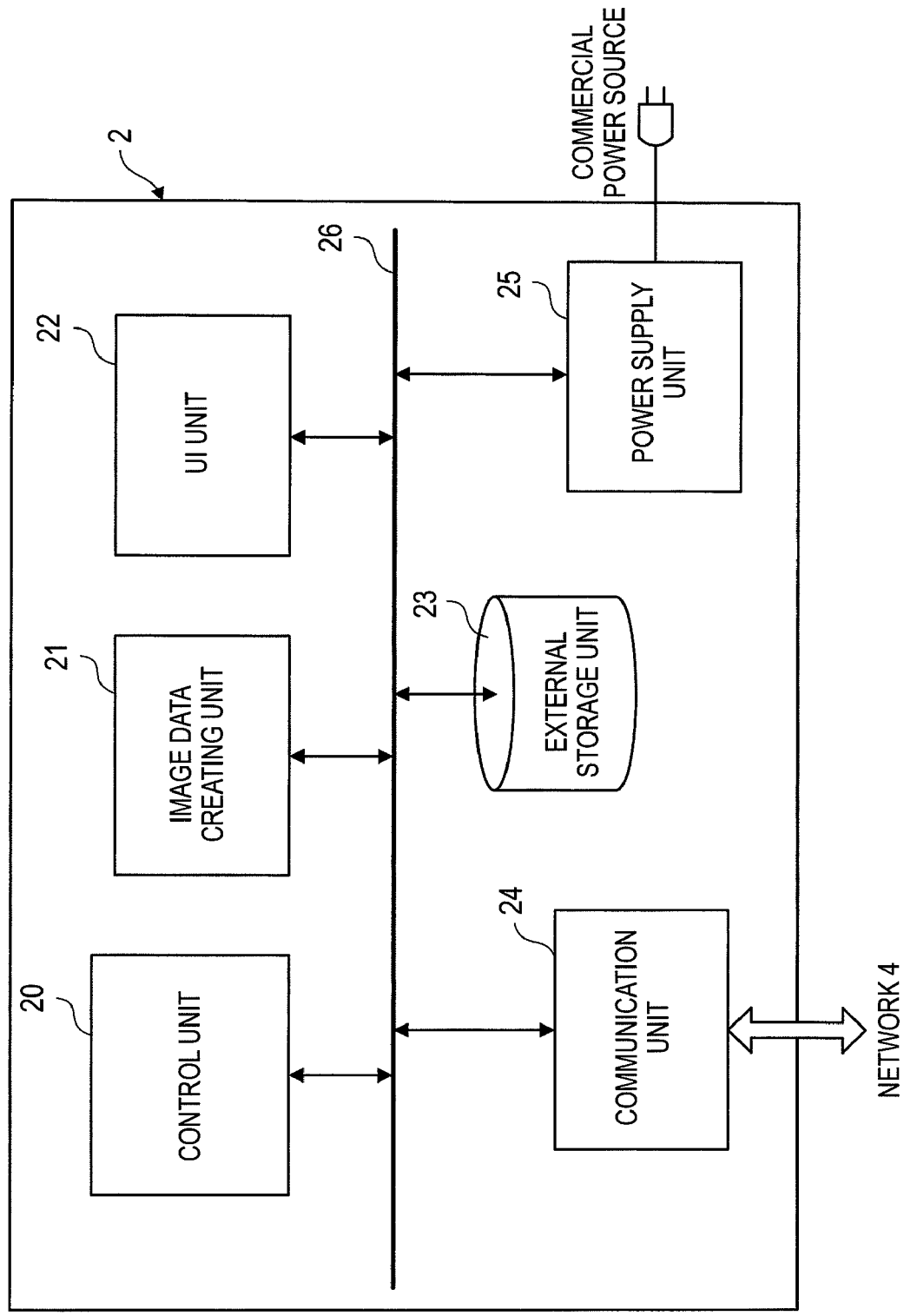
FIG. 2 is a block diagram describing the configuration of a terminal device of the exemplary embodiment.

FIG. 2 is block diagram describing the configuration of the terminal device 2 of the present exemplary embodiment. As shown in FIG. 2, the terminal device 2 is equipped with a control unit 20 that controls the operation of the entire terminal device 2 and performs various types of information processing, an image data creating unit 21 that creates image data in accordance with application software determined beforehand, and a user interface (UI) unit 22 that accepts instruction input from a user and displays various types of information to the user. Further, the terminal device 2 is equipped with an external storage unit 23 in which programs and various types of data are stored and a communication unit 24 that communicates with the network 4 and transmits the image formation command relating to image data to the image forming apparatus 3, for example. Moreover, the terminal device 2 is equipped with a power supply unit 25 that supplies power to each functional unit of the terminal device 2.

The control unit 20, the image data creating unit 21, the UI unit 22, the external storage unit 23, the communication unit 24 and the power supply unit 25 are connected to a peripheral component interconnect (PCI) bus 26 and transmit and receive signals and information to and from each other.

The above-described functional units of the terminal device 2 are realized as a result of software and hardware resources cooperating with each other. Specifically, in the external storage unit 23, there are stored an operating system for controlling each functional unit of the terminal device 2, application software that cooperates with the operating system to execute the particular functions of each functional unit, and a printer driver program that generates the image formation command (print command; hereinafter "print job") to the image forming apparatus 3 relating to image data that have been created by the image data creating unit 21 and image data that have been stored in the external storage unit 23. Additionally, an unillustrated CPU of the terminal device 2 reads these programs from the external storage unit 23 to a main storage device (e.g., a RAM) and performs processing that realizes the functions of each functional unit such as the control unit 20, the image data creating unit 21 and the communication unit 24.

Description of Generation/Transmission of Print Job in Terminal Device

When a print instruction resulting from a user is inputted to the UI unit 22 in the terminal device 2, the control unit 20 reads the printer driver program from the external storage unit 23 and causes the printer driver program to start. Thus, the control unit 20 executes processing that generates a print job relating to image data that have been created by the image data creating unit 21 and image data that have been stored in the external storage unit 23 in accordance with the printer driver program. Then, the control unit 20 transmits the generated print job from the communication unit 24 to the image forming apparatus 3.

It will be noted that "image formation command (print job)" means one lump set of data (print job data) where various types of attribute data that designate the printing format, such as number of print copies, paper size, N-up (printing that assigns N pages (logical pages) of an electronic document into one page (physical page) of paper) and margin sizes, for example, have been added to the image data.

Description of Services that Terminal Device Requests of Image Forming Apparatus via Network The control unit 20 of the terminal device 2 reads various types of application software from the external storage device 23, causes the application software to start, and transmits, from the communication unit 24, signals (hereinafter "service packets") requesting the provision of various types of services with respect to the image forming apparatus 3 connected to the network 4.

Specifically, the control unit 20 of the terminal device 2 requests the image forming apparatus 3 to provide various types of services such as, for example, a service requesting the provision of setting/management information managed in a management information base (MIB) inside the image forming apparatus 3 using Simple Network Management Protocol (SNMP) and a service responding to a request for notification of an Internet Protocol (IP) address using Web Services Dynamic Discovery (WS-Discovery).

In that case, the control unit 20 designates the content of the service requested of the image forming apparatus 3 by data described in a data region (payload) of the packet. Further, the control unit 20 designates the type of the service requested of the image forming apparatus 3 by protocol type (Transmission Control Protocol (TCP) or User Datagram Protocol (UDP)) and address port number (port number) described in the packet. The protocol type is described in the Network Layer (IP header) of the packet and identifies the protocol type of the Transport Layer. Further, the port number is described in the Transport Layer (TCP header or UDP header) of the packet and is information that identifies a higher-level protocol. The protocol that executes the various types of services that the packet requests is uniquely determined as a result of the protocol type and the port number being designated in the packet. For that reason, the type of service requested of the image forming apparatus 3 is identified in the image forming apparatus 3 by the protocol and the port number that are designated in the packet.

Description of Image Forming Apparatus

Next, the image forming apparatus 3 will be described.

When the image forming apparatus 3 of the present exemplary embodiment receives a service packet requesting the provision of a service from the terminal device 2 via the network 4 and processes the received service packet, the image forming apparatus 3 stores, in a storage device, information (hereinafter "response information") relating to a signal (hereinafter "response packet") responding to the transmission source terminal device 2 by processing the service packet. The response information here is, for example, configured as a result of the type and content of the service described in the received service packet and the content (hereinafter "response content") of data responding to the transmission source by the response packet in response to that service packet and the attribute information of the response content being correlated with each other.

Additionally, when the image forming apparatus 3 receives a service packet in a set period of a power saving state, the image forming apparatus 3 searches for the type and content of the service described in the service packet. Thus, the image forming apparatus 3 determines whether or not response information with which the type and content of the service described in the service packet received this time match exists in the response information already stored in the storage device. If response information with which the type and content of the service described in the service packet received this time match exists in the storage device, the image forming apparatus 3 reads, from the storage device, the response content correlated with the type and content of the service and transmits, to the transmission source terminal device 2, a response packet in which the response content that has been read is described. Thus, it becomes unnecessary for the image forming apparatus 3 to regenerate response content to be set in a response packet responding to the service packet with which the type and content of the requested service match, and the amount of processing time for the image forming apparatus 3 to generate a response packet is shortened. As a result, the amount of startup time of the processing unit (CPU) that processes service packets in the power saving state becomes shorter, and power consumption by the processing unit is kept low.

Description of Configuration of Image Forming Apparatus

Next, the configuration of the image forming apparatus 3 of the present exemplary embodiment that performs the above-described operation will be described.

Figure 3:
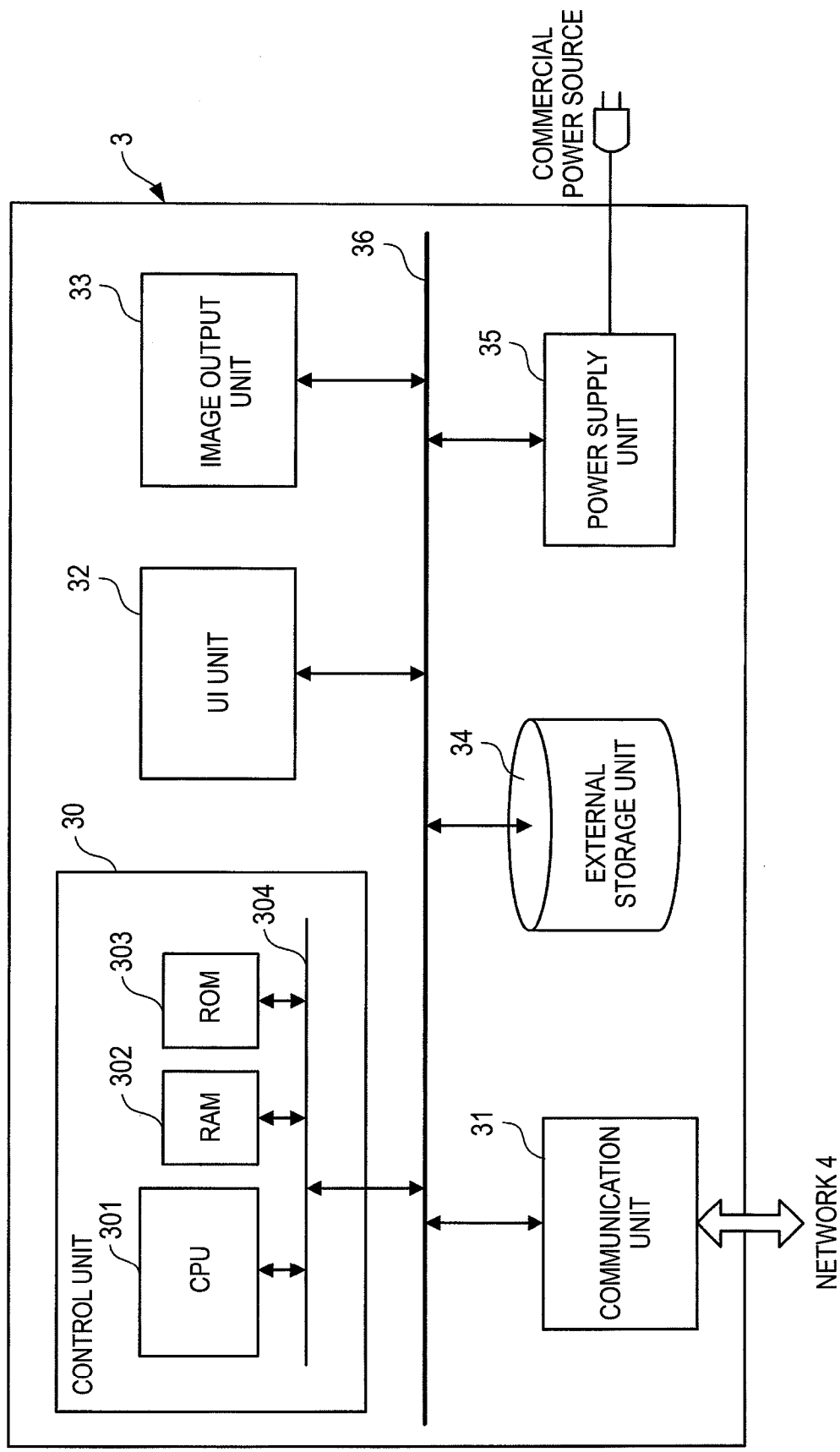
FIG. 3 is a block diagram describing the configuration of an image forming apparatus of the exemplary embodiment.

FIG. 3 is a block diagram describing the configuration of the image forming apparatus 3 of the present exemplary embodiment. As shown in FIG. 3, the image forming apparatus 3 is equipped with a control unit 30 serving as one example of a processing unit that controls the operation of the entire image forming apparatus 3 and performs various types of information processing such as processing acquired packets (print jobs, service packets, etc.) and a communication unit 31 serving as one example of a receiving unit that communicates with the network 4 and transmits and receives signals.

The control unit 30 is equipped with a CPU 301 serving as one example of an arithmetic device that performs arithmetic processing when executing operation control and information processing, a RAM 302 serving as one example of a main storage device that is used as a working memory of the CPU 301, and a ROM 303 in which are stored data such as setting values that are used by programs executed by the CPU 301. Additionally, the CPU 301, the RAM 302 and the ROM 303 are connected to each other via a PCI bus 304.

Further, the image forming apparatus 3 is equipped with a user interface (UI) unit 32 that accepts instruction input from a user and displays various types of information to the user and an image output unit 33 serving as one example of an image forming unit that forms an image on paper in accordance with a print job transmitted from the terminal device 2 via the network 4. An electrophotographic image forming engine, for example, is used as the image output unit 33.

In addition, the image forming apparatus 3 is equipped with an external storage unit 34 serving as one example of an external storage device in which are stored various types of programs such as an operating system for controlling each functional unit of the image forming apparatus 3 and application software that cooperates with the operating system to execute the particular functions of each functional unit and various types of data such as image data.

Further, the image forming apparatus 3 is equipped with a power supply unit 35 that supplies alternating-current power of 100 V, for example, from a commercial power supply, or converts the alternating-current power from the commercial power supply into direct-current voltages (e.g., 24 V, 12 V, 5 V, 3 V) determined beforehand, and supplies the power to each functional unit as drive power and control power. Additionally, the power supply unit 35 sets the supply and stopping of drive power and control power to each functional unit in accordance with the operating mode (operating state) of the image forming apparatus 3 that the control unit 30 sets. On the other hand, the power supply unit 35 always supplies control power to the communication unit 31.

The control unit 30, the communication unit 31, the UI unit 32, the image output unit 33, the external storage unit 34 and the power supply unit 35 disposed in the image forming apparatus 3 are connected to a PCI bus 36 and transmit and receive signals to and from each other.

Further, the above-described functional units of the image forming apparatus 3 are realized as a result of software and hardware resources cooperating with each other. Specifically, the CPU 301 of the control unit 30 of the image forming apparatus 3 reads various programs such as the operating system and the application software from the external storage unit 34 to the main storage device (the RAM 302), performs processing that realizes the functions of each functional unit such as the control unit 30, the communication unit 31, the UI unit 32, the image output unit 33, the external storage unit 34 and the power supply unit 35, and moreover executes operation control and information processing with respect to each functional unit.

It will be noted that, as another provision configuration relating to the various types of programs such as the operating system and the application software, there is a configuration where the programs are provided in a state where they have been stored in the ROM 303 beforehand and the programs are loaded to the RAM 302. Moreover, there is also a configuration where, when the image forming apparatus 3 is equipped with a rewritable ROM 303 such as an EEPROM, the CPU 301 of the control unit 30 is set and thereafter just the programs are installed in the ROM 303 and loaded in the RAM 302. Further, there is also a configuration where the programs are transmitted to the control unit 30 via the network 4 such as the Internet, installed in the ROM 303 of the control unit 30 and loaded to the RAM 302. Moreover, there is a configuration where the programs are loaded to the RAM 302 from an external recording medium such as a DVD-ROM or a flash memory.

Description of Functions of Control Unit of Image Forming Apparatus

Next, the functions of the control unit 30 of the image forming apparatus 3 will be described.

Description of Function of Processing Print Job

The control unit 30 of the image forming apparatus 3 first, for example, has the function of processing a print job that has been transmitted to the image forming apparatus 3 via the network 4 from the terminal device 2. That is, the control unit 30 administers, in accordance with a print job that has been transmitted via the network 4, processing (image processing) to image data included in the print job and forwards the processed image data to the image output unit 33.

It will be noted that, as the image processing that the control unit 30 performs with respect to the image data included in the print job, there are included PDL analysis processing that analyzes, for example, PDL (Page Description Language) format image data included in the print job and generates intermediate data, rendering processing that renders intermediate data that have been generated by PDL analysis processing into image data (raster image data or the like) for image formation realized in an arrangement of pixels, color conversion processing that color-converts the rendered image data into color system image data (e.g., YMCK) suited for printing processing, and screen processing with respect to the color-converted image data.

Figure 4:
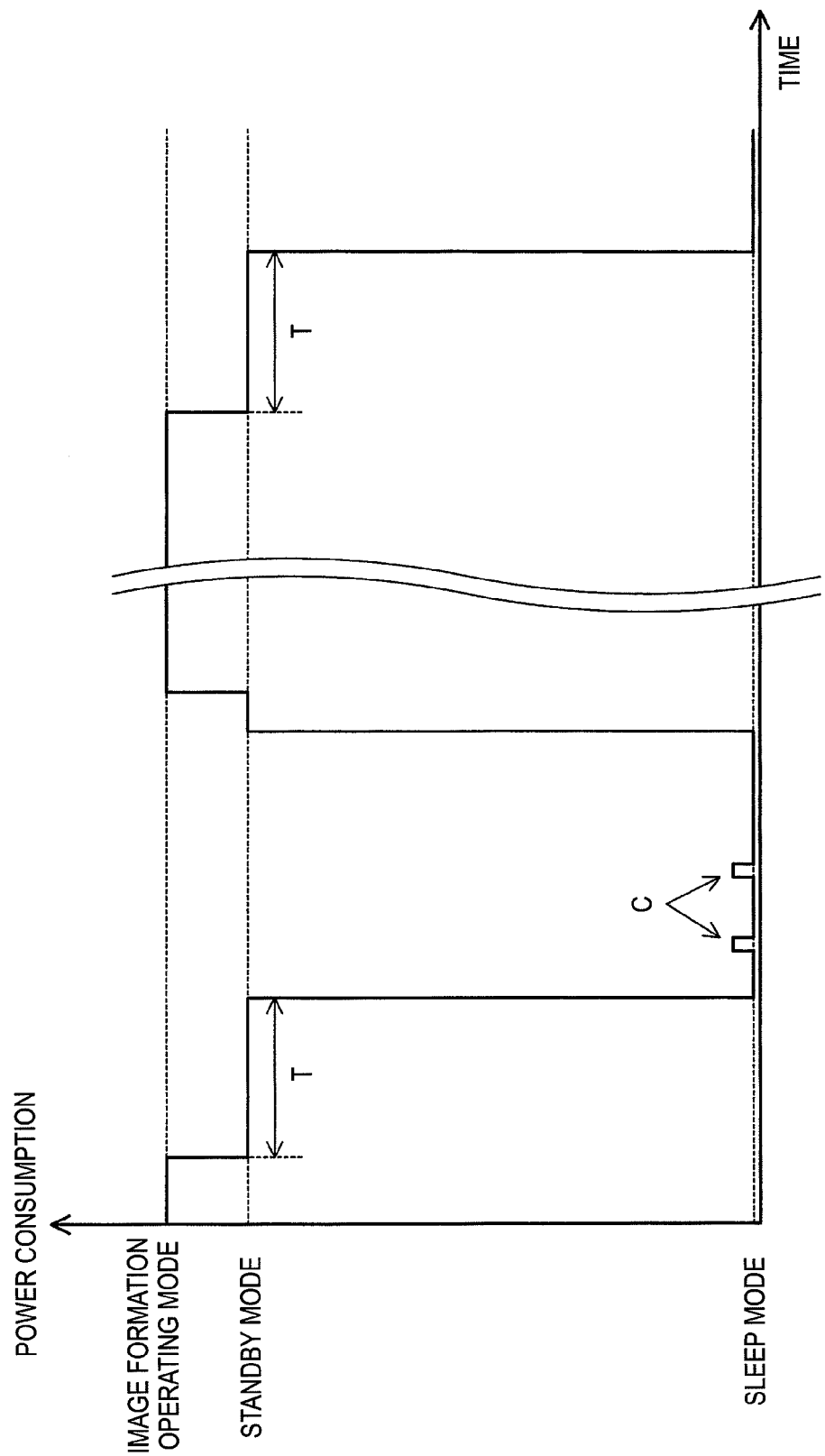
FIG. 4 is a diagram describing operating modes that are set in the image forming apparatus of the exemplary embodiment.

Description of Function of Controlling Operating State of Image Forming Apparatus Further, the control unit 30 has the function of controlling the operating mode (operating state) of the image forming apparatus 3 in accordance with the reception situation of a print job from the terminal device 2, for example. FIG. 4 is a diagram describing operating modes that are set in the image forming apparatus 3 of the present exemplary embodiment. As shown in FIG. 4, the control unit 30 selectively sets an "image formation operating mode", a "standby mode" and a "sleep mode" as the operating modes.

The image formation operating mode is an operating state that is set when image-processed image data have been forwarded to the image output unit 33 and the image output unit 33 is executing image formation operation on paper in accordance with a print job. Further, the standby mode is set when the image forming apparatus 3 has acquired a print job from the terminal device, for example, or when there is instruction input from a user in the UI unit 32. Additionally, the standby mode is an operating state where the image forming apparatus 3 transitions to the image formation operating mode immediately when image processing relating to all or some of the image data included in a print job has ended in the control unit 30, for example. Moreover, sometimes the standby mode is also set in a period determined beforehand after the end of the image formation operating mode. In the image formation operating mode and in the standby mode based thereon, drive power is supplied to the functional units that perform operation relating to image formation inside the image forming apparatus 3 from the power supply unit 35, and control power is supplied to the functional units that perform operation relating to control and processing inside the image forming apparatus 3.

The sleep mode is an operating state that is set when a print job is not received again or there is no instruction input from the user in the UI unit 32 even after the elapse of standby time T equal to an amount of time determined beforehand after the image formation operating mode ends and the standby mode has been set, for example. In the sleep mode, only input units (not shown) of the communication unit 31 and the UI unit 32 continue to operate, and all other functional units stop operating. That is, in the sleep mode, the supply of control power from the power supply unit 35 to the communication unit 31 is continued. On the other hand, drive power from the power supply unit 35 to the functional units that perform operation relating to image formation inside the image forming apparatus 3 is stopped, and control power to the functional units that perform operation relating to control and processing inside the image forming apparatus 3 is stopped. Thus, power saving in the image forming apparatus 3 is achieved by the sleep mode.

Here, in the sleep mode, control power to the CPU 301 of the control unit 30 is stopped, and the supply of control power to the RAM 302 and the ROM 303 inside the control unit 30 is continued. Thus, the CPU 301 is set in a stopped state in the sleep mode, and further power saving in the image forming apparatus 3 is achieved. However, even in the sleep mode, when a signal received by the communication unit 31 is a service packet that requires processing by the control unit 30, the control unit 30 returns from the stopped state (e.g., "C" region portions in FIG. 4) and processes the service packet. In this case, power consumption in the sleep mode increases by the amount of power consumed by the control unit 30.

When the image forming apparatus 3 does not receive a print job even after the elapse of the standby time T after the standby mode has been set after the end of the image formation operating mode, for example, the control unit 30 generates a sleep mode transition signal instructing transition to the sleep mode. It will be noted that the standby time T here also includes "0" and that the control unit 30 may also generate the sleep mode transition signal immediately after the standby mode has been set.

On the other hand, when the image forming apparatus 3 receives a print job in a state where the sleep mode has been set, or when there is instruction input from the user in the UI unit 32 in a state where the sleep mode has been set, the supply of control power with respect to the CPU 301 of the control unit 30 from the power supply unit 35 is resumed. Thus, the CPU 301 of the control unit 30 returns from the stopped state and generates a sleep mode return signal instructing return from the sleep mode. Further, when the image forming apparatus 3 receives a service packet in a state where the sleep mode has been set, the CPU 301 of the control unit 30 returns from the stopped state and processes the service packet. However, in this case, control unit 30 does not generate the sleep mode return signal.

Additionally, when the control unit 30 (the CPU 301) generates the sleep mode transition signal or the sleep mode return signal, the control unit 30 transmits these to the power supply unit 35 via the PCI bus 36. When the power supply unit 35 receives the sleep mode transition signal from the control unit 30, the power supply unit 35 stops supplying drive power and control power to each functional unit. Thus, the functional units (including the CPU 301) other than the input units (not shown) of the communication unit 31 and the UI unit 32 stop operating.

Further, when the power supply unit 35 receives the sleep mode return signal from the control unit 30, the power supply unit 35 starts supplying drive power and control power to each functional unit. Thus, the functional units associated with image formation processing, such as the image output unit 33 and the external storage unit 34, are set in an operable state (a running state).

Description of Function of Processing Packet Requesting Provision of Service

Further, the control unit 30 of the image forming apparatus 3 has the function of processing a service packet requesting the provision of a service received from the terminal device 2 via the network 4. At that time, when the control unit 30 has processed a received service packet, the control unit 30 stores, in a storage device, information (response information) relating to the response packet transmitted to the transmission source terminal device 2 by processing the service packet. The response information here is, for example, configured as a result of the type and content of the service that are the request content of the service described in the received service packet and, as information relating to the content (response content) of data that is provision content of the service transmitted to the transmission source by the response packet and attribute information relating to the response content, the date and time when the service packet was processed (date and time of provision), the number of times that the response packet was transmitted (number of times of provision) and identification information such as a Medium Access Control (MAC) address or an Internet Protocol (IP) address that identifies the terminal device 2 that is the transmission source of the service packet (the transmission destination of the response packet) being correlated with each other. In relation to the date and time when the service packet was processed and the number of times that the response packet was transmitted, either one or both of these may also be configured as attribute information.

Here, as the storage device inside the image forming apparatus 3 in which the response information is stored, when the image forming apparatus 3 is set in the sleep mode, there is used a memory region inside the RAM 302 serving as one example of a storage unit disposed in the control unit 30.

As described above, the control unit 30 of the image forming apparatus 3 uses the memory region allocated beforehand as a work region inside the RAM 302 when performing rendering processing relating to the image data included in a print job that has been transmitted from the terminal device 2 in the process of image formation processing. This memory region inside the RAM 302 usually has a storage capacity of several hundred MB and has a memory capacity that is sufficiently large enough for storing the response information. Additionally, the memory region becomes empty and is not used at the time of the power saving state setting where image formation processing is not executed. Thus, in the sleep mode setting period, the memory region inside the RAM 302 that is used as a work region at the time of rendering processing is used as a memory region for storing the response information. Thus, power consumption is kept low because it is not necessary to cause the external storage unit 34 to return from the power saving state.

On the other hand, when the image forming apparatus 3 returns to the running state (image formation operating mode or standby mode), the response information stored in the RAM 302 is forwarded to the external storage unit 34. Then, when the image forming apparatus 3 transitions to the sleep mode, the image forming apparatus 3 forwards the response information stored in the external storage unit 34 back to the RAM 302 inside the control unit 30.

It will be noted that, when the image forming apparatus 3 forwards the response information stored in the external storage unit 34 to the RAM 302, the image forming apparatus 3 may forward the response information to the RAM 302 in a state where the response information is also allowed to remain in the external storage unit 34, or the image forming apparatus 3 may erase the response information from the external storage unit 34. However, when the image forming apparatus 3 erases the response information from the external storage unit 34 or when new response information is added to the response information stored in the RAM 302, the image forming apparatus 3 performs processing that forwards the response information stored in the RAM 302 to the external storage unit 34 when the image forming apparatus 3 returns to the running state from the sleep mode.

When the control unit 30 receives a service packet in the sleep mode setting period, the control unit 30 searches for the type and content of the service described in the service packet. Thus, the control unit 30 determines whether or not response information with which the type and content of the service described in the service packet received this time match exists in the response information already stored in the RAM 302. If response information with which the type and content of the service described in the service packet received this time match exists in the RAM 302, the control unit 30 reads, from the RAM 302, the response content correlated with the type and content of the requested service and transmits, to the transmission source terminal device 2, a response packet in which the response content that has been read is described. Thus, it is not necessary for the image forming apparatus 3 to regenerate response content to be set in a response packet responding to the service packet with which the type and content of the requested service match, and the amount of processing time for the image forming apparatus 3 to generate a response packet is shortened. As a result, the amount of time required for the control unit 30 to process the service packet becomes shorter, the amount of startup time of the CPU 301 is shortened, and power consumption is kept low.

Description Relating to Response Information Stored in RAM

Next, the response information relating to the response packet that the control unit 30 transmits to the transmission source (the terminal device 2) by processing the service packet will be described. Here, response information in regard to a response packet that the control unit 30 transmits with respect to a service packet requesting the provision of setting/management information managed in the MIB inside the image forming apparatus 3 using SNMP will be exemplified and described.

The MIB is information that is usually defined by RFC-1759 of the Internet Engineering Task Force (IETF), which is an Internet standardization group, and is made public by informing an external device (the terminal device 2) of the setting state of its own apparatus (the image forming apparatus 3). Information (setting/management information of the image forming apparatus 3) is stored per unit called an object in the MIB, and identifiers (object IDs) are allocated to those objects. The terminal device 2 designates this object ID in SNMP to thereby request, with respect to a target device (the image forming apparatus 3), the acquisition of setting/management information such as the status (operating/setting state) of the image forming apparatus 3, the use situation of expendables in the image forming apparatus 3, and an alert history.

Specifically, the terminal device 2 communicates with the image forming apparatus 3 via the network 4 and accesses the image forming apparatus 3 with the IP address of the image forming apparatus 3. Then, the terminal device 2 designates the identifier (object ID) allocated to the object in which the setting/management information that the terminal device 2 wants to acquire is stored and uses a SNMP command (Get Request command) to acquire the setting/management information of the object corresponding to the designated object ID from the MIB of the image forming apparatus 3.

To give one example, the terminal device 2 sets an IP address "192.168.10.11" of the image forming apparatus 3 in the header region of the service packet, sets in the data region (payload) a SNMP command (Get Request command) and an object ID "0.1.3.6.1.4.1.253.3.7.7.7" allocated to the object in which the setting/management information that the terminal device 2 wants to acquire is stored, and transmits the service packet to the image forming apparatus 3.

Thus, the CPU 301 of the image forming apparatus 3 generates a response packet in which the setting/management information of the object corresponding to the object ID "0.1.3.6.1.4.1.253.3.7.7.7" is described as response content. Then, the CPU 301 sends the generated response packet to the transmission source terminal device 2.

In this case, in the control unit 30 (the CPU 301) of the image forming apparatus 3, "SNMP", which is the type of service requested from the transmission source by the received service packet, "object ID: .1.3.6.1.4.1.253.3.7.7.7", which is the content of the requested service, setting/management information ("Info_1") of the object corresponding to the object ID (.1.3.6.1.4.1.253.3.7.7.7), which is the response content transmitted to the transmission source by the response packet, and attribute information comprising the date and time (xx/yy/zz) that the response packet was transmitted, the number of times (ss) that the response packet was transmitted and, for example, the IP address identifying the terminal device that is the transmission destination of the response packet (the transmission source of the service packet) are correlated with each other and stored in the RAM 302 as "response information relating to response packet".

It will be noted that the type of service (e.g., "SNMP") is designated by the protocol type (TCP, UDP) and the port number described in the packet, so the protocol type (TCP, UDP) and the port number described in the service packet may also be stored as response information. Further, at that time, the protocol type is described by the Network Layer (IP header) of the packet and the port number is described in the Transport Layer (TCP header, UDP header) of the packet, so information relating to an Open Systems Interconnection (OSI) hierarchy in which the protocol type and the port number are described may also be combined and stored. Thus, precision when identifying the type of service improves.

It will be noted that data that are not necessary when generating the response packet, such as sequence numbers, identification information of the image forming apparatus 3 (MAC address, IP address), cyclic redundancy check (CRC) values and checksum data, are not included in the response information.

Here, FIG. 5 is a diagram showing one example of a table (response information table) of response information relating to response packets stored in the RAM 302.

As exemplified in FIG. 5, the control unit 30 (the CPU 301) processes received service packets, and response information relating to response packets transmitted to the terminal device 2 that is the transmission source is stored as a response information table in the RAM 302 at the time of the sleep mode setting. Additionally, when the control unit 30 receives a service packet from the communication unit 31 in the sleep mode setting period, the control unit 30 searches for the type and content of the service requested from the terminal device 2 by the service packet. Thus, the control unit 30 determines whether or not response information with which the type and content of the service described in the service packet received this time match exists in the response information already stored in the RAM 302.

For example, when the type and content of the service described in the service packet received this time match the type "SNMP" of the service shown in No. 2 in FIG. 5 and the requested service content "Object ID: .1.3.6.1.4.1.253.3.7.7.7", "Object ID: .1.3.6.1.4.1.253.3.8.8.8" and "Object ID: .1.3.6.1.4.1.253.3.9.9.9", the CPU 301 generates a response packet in which the response content "setting/management information: Info_2, Info_3, Info_4" stored in the RAM 302 is described as the response content. Then, the CPU 301 sends the generated response packet from the communication unit 31 to the terminal device 2 that is the source of transmission of the service packet 2.

In that case, the CPU 301 increments ("1"→"2") the number of times of transmission that is one piece of the attribute information. Further, the CPU 301 updates the date and time that the response packet was transmitted.

Further, when response information with which the type and content of the service described in the service packet received this time match does not exist in the response information stored in the RAM 302, the CPU 301 executes processing corresponding to the requested service in relation to the received service packet. Then, the CPU 301 correlates the type and content of the service described in the service packet and the processing content and attribute information obtained as a result of processing with each other and newly adds this response information to the response information table exemplified in FIG. 5.

In this manner, if response information matching the type and content of a service described in a received service packet is stored in the response information table inside the RAM 302, it is not necessary for the control unit 30 (the CPU 301) to generate response content again from the MIB. That is, the CPU 301 can set response content in a response packet simply by reading response content from the response information table stored in the RAM 302. Thus, processing with respect to the service packet is performed in a short amount of time, so the amount of startup time of the CPU 301 that processes the service packet becomes shorter. As a result, power consumption by the CPU 301 is kept low.

It will be noted that, in the above description, SNMP is taken as an example and described as the type of service, but the same is also true in relation to other services.

Description Relating to Processing of Packet that Control Unit Performs

Figure 6:
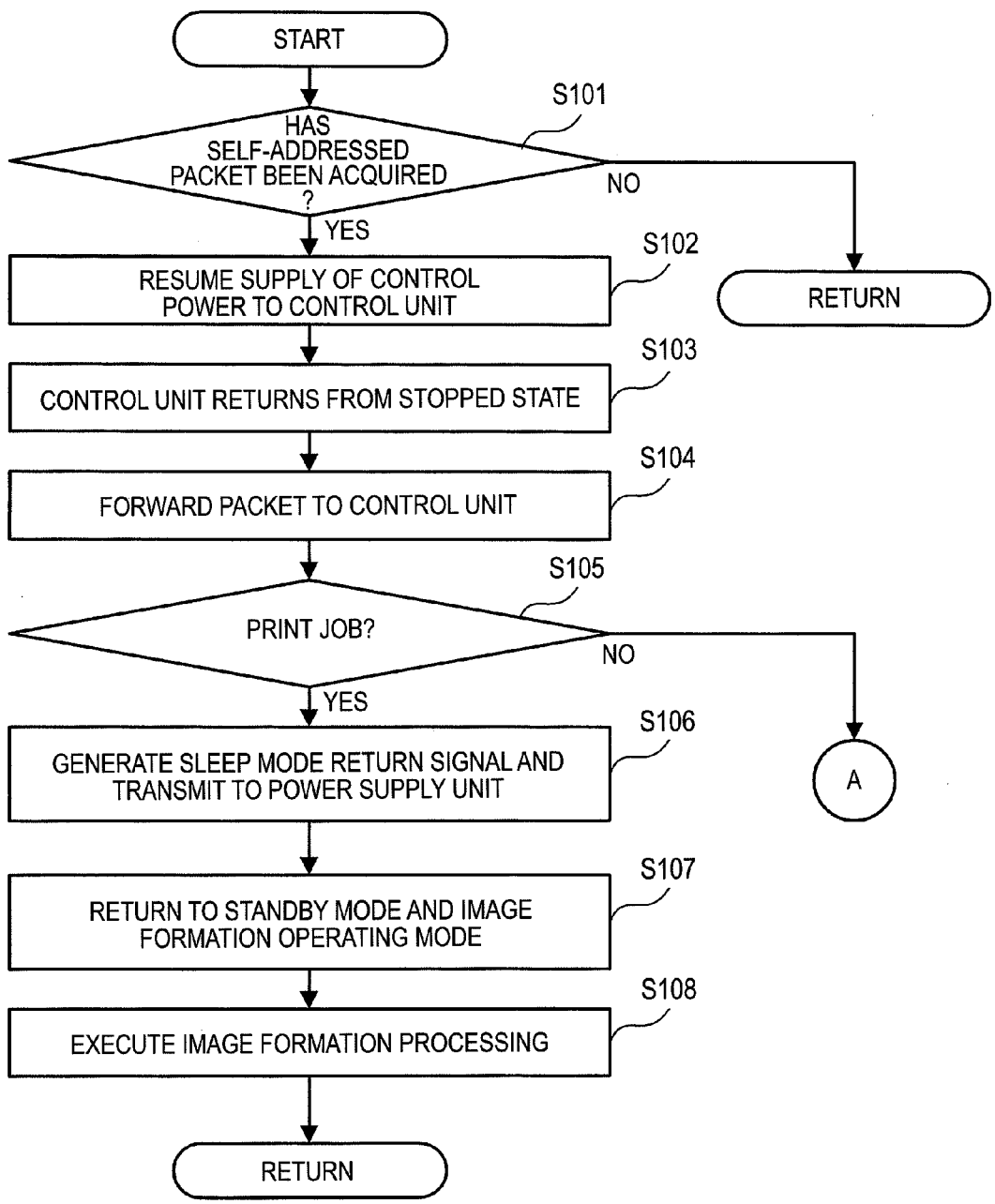
FIG. 6 is the first half of a flowchart showing one example of processing content that the image forming apparatus of the exemplary embodiment performs in relation to a packet that the image forming apparatus has received in a sleep mode setting period.
Figure 7:
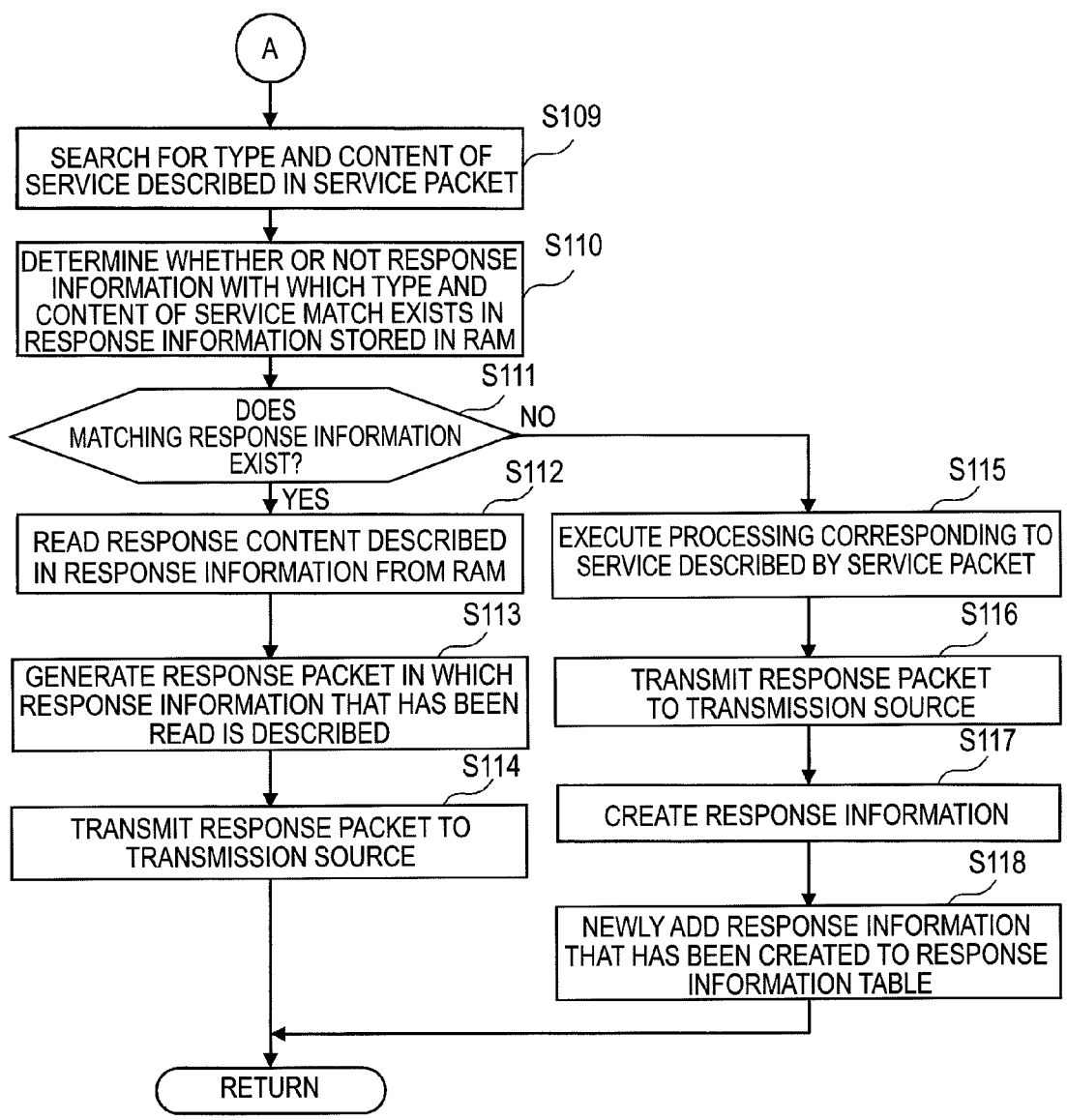
FIG. 7 is the last half of a flowchart showing one example of processing content that the image forming apparatus of the exemplary embodiment performs in relation to a packet that the image forming apparatus has received in a sleep mode setting period.

FIG. 6 and FIG. 7 are a flowchart showing one example of processing content that the image forming apparatus 3 of the present exemplary embodiment performs in relation to a packet received in the sleep mode setting period.

First, as shown in the flowchart of FIG. 6, in the image forming apparatus 3 of the present exemplary embodiment, when the communication unit 31 acquires a self-addressed packet via the network 4 (YES in step 101), the communication unit 31 causes the supply of control power with respect to the control unit 30 (the CPU 301) from the power supply unit 35 to resume (step 102). Thus, the control unit 30 (the CPU 301) returns from the stopped state (step 103). Then, the communication unit 31 forwards the acquired packet to the control unit 30 that has returned from the stopped state (step 104). The control unit 30 determines whether or not the acquired packet is a print job or a service packet (step 105).

On the other hand, when a packet is not acquired by the communication unit 31, or when an acquired packet is not a self-addressed packet, the communication unit 301 monitors packets from the network 4 (NO in step 101).

When the acquired packet is a print job (YES in step 105), the control unit 30 generates a sleep mode return signal and transmits the sleep mode return signal to the power supply unit 35 (step 106). Thus, the control unit 30 causes the image forming apparatus 3 to return to the standby mode and moreover to the image formation operating mode (step 107), executes image formation processing (step 108) and ends processing of the packet.

Moving to the next flowchart of FIG. 7, when the acquired packet is a service packet (NO in step 105), the control unit 30 searches for the type and content of the service described in the service packet (step 109). Then, the control unit 30 determines whether or not response information with which the type and content of the service described in the service packet match exists in the response information already stored in the RAM 302 (step 110). If response information with which the type and content of the service described in the service packet match exists in the RAM 302 (YES in step 111), the control unit 30 reads the response content described in the response information from the RAM 302 (step 112) and generates a response packet in which the response content that has been read is described (step 113). Then, the control unit 30 transmits the response packet from the communication unit 31 to the terminal device 2 that is the transmission source of the service packet (step 114).

On the other hand, if response information with which the type and content of the service described in the service packet match does not exist in the RAM 302 (NO in step 111), the control unit 30 executes processing corresponding to the service described by the received service packet (step 115) and transmits a response packet from the communication unit 31 to the terminal device 2 that is the transmission source of the service packet (step 116). Then, the control unit 30 creates response information in which the type and content of the service described in the service packet and the processing content and attribute information thereof described in the response packet are correlated with each other (step 117). Then, the control unit 30 newly adds the created response information to the response information table (step 118).

It will be noted that the control unit 30 may also be configured such that, when the data region inside the RAM 302 that has been allocated for the response information table is insufficient when the control unit 30 newly adds response information to the response information table in step 118, the control unit 30 references the attribute information of the response information and deletes response information in order beginning, for example, with response information whose number of times of transmission is few. This is because response content that is described in a response packet and whose number of times of transmission is few is correlated, so even if the control unit 30 deletes response information whose number of times of transmission is few, the affect on the amount of time required for the control unit 30 to process a service packet is small.

Further, the control unit 30 may also be configured to delete response information in order beginning with response information with an old date and time, for example. Response information with an old date and time is response information with which response content whose number of times of transmission is few is correlated because it is information where the amount of time that has elapsed since it was described in a previous response packet and transmitted is long. For that reason, even if the control unit 30 deletes response information with an old date and time, the affect on the amount of time required for the control unit 30 to process a service packet is small.

Further, the control unit 30 may also be configured to delete response information in order on the basis of both the number of times of transmission and the date and time.

Moreover, the control unit 30 may also be configured such that, after the control unit 30 returns to the running state (the image formation operating mode and the standby mode) and the response information is transmitted from the RAM 302 to the external storage device 34, the control unit 30 can output the response information to, for example, a management device (not shown) that manages the network 4. Thus, the management device can extract the terminal device 2 that repeats provision of the same service with respect to the image forming apparatus 3 on the basis of the attribute information included in the response information and can apply an alert with respect to that terminal device 2. Further, in that case, the control unit 30 may also be configured such that the image output unit 33 prints the response information as a report.

Further, the control unit 30 may also be configured such that the response information can be deleted by an instruction from a user.

As described above, in the image forming apparatus 3 that is used in the image forming system 1 of the present exemplary embodiment, when the image forming apparatus 3 receives a service packet in the setting period of the power saving state, the image forming apparatus 3 searches for the type and content of the service described in the service packet. Thus, if response information with which the type and content of the service described in the service packet received this time match exists in the response information already stored in the storage device, the image forming apparatus 3 reads from the storage device the response content correlated with the type and content of the service and transmits to the transmission source terminal device 2 a response packet in which the response content that has been read is described. Thus, it becomes unnecessary for the image forming apparatus 3 to regenerate response content to be set in a response packet, and the amount of processing time for the image forming apparatus 3 to generate a response packet is shortened. As a result, the amount of startup time of the processing unit (CPU) that processes service packets in the power saving state becomes shorter, and power consumption by the processing unit is kept low.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
a receiving unit that receives, from an external device via a communication line, a signal requesting provision of various types of services;
a processing unit that when the receiving unit receives the signal in a setting period of a power saving state where power consumption is lower than in a running state, returns to the running state to process the signal and provide a service corresponding to the signal; and
a memory that stores a content of the service provided by the processing unit and a content of a request requested by the signal, the content of the service and the content of the request being correlated respectively,
wherein when the request received by the receiving unit in the setting period of the power saving state matches the content of the request stored in the memory, the processing unit reads the content of the service correlated with the content of the request from the memory and provides the service corresponding to the content of the service to the external device,
wherein the processing unit has an arithmetic device and a main memory, and the memory is set in a data region inside the main memory that is configured as a work region when the arithmetic device processes an image formation command in the running state.

2. An information processing apparatus, comprising:
a receiving unit that receives, from an external device via a communication line, a signal requesting provision of various types of services;
a processing unit that when the receiving unit receives the signal in a setting period of a power saving state where power consumption is lower than in a running state, returns to the running state to process the signal and provide a service corresponding to the signal; and
a memory that stores a content of the service provided by the processing unit and a content of a request requested by the signal, the content of the service and the content of the request being correlated respectively,
wherein the service provided by the processing unit by processing the signal is correlated with the content of the request requested by the signal,
wherein when the request received by the receiving unit in the setting period of the power saving state matches the content of the request stored in the memory, the processing unit reads the content of the service correlated with the content of the request from the memory and provides the service corresponding to the content of the service to the external device.

3. The information processing apparatus according to claim 2, wherein the content of the service provided by the processing unit is correlated with either one or both of a number of times of provision of the service and a date and time of provision of the service.

4. An information processing apparatus, comprising:
a receiving unit that receives, from an external device via a communication line, a signal requesting provision of various types of services;
a processing unit that when the receiving unit receives the signal in a setting period of a power saving state where power consumption is lower than in a running state, returns to the running state to process the signal and provide a service corresponding to the signal; and
a memory that stores a content of the service provided by the processing unit and a content of a request requested by the signal, the content of the service and the content of the request being correlated respectively,
wherein when the request received by the receiving unit in the setting period of the power saving state matches the content of the request stored in the memory, the processing unit reads the content of the service correlated with the content of the request from the memory and provides the service corresponding to the content of the service to the external device,
wherein when the processing unit transitions to the power saving state, the processing unit forwards, to an external storage device, the content of the service stored in the memory and the content of the request correlated with the content of the service.

5. An information processing method, comprising:
receiving, from an external device via a communication line, a signal requesting provision of various types of services;

when the signal is received in a setting period of a power saving state where power consumption is lower than in a running state, returning to the running state to process the signal and provide a service corresponding to the signal;

reading a content of the provided service correlated with a content of a request requested by the signal from a memory; and providing the service corresponding to the content of the service to the external device, when the received request in the setting period of the power saving state matches the content of the request stored in the memory, wherein the content of the provided service is correlated with either one or both of a number of times of provision of the service and a date and time of provision of the service.

6. The information processing method according to claim 5, wherein on the basis of either one or both of the number of times of provision and the date and time of provision of the service, erasing the stored content of the service.

7. An information processing method, comprising:

receiving, from an external device via a communication line, a signal requesting provision of various types of services;

when the signal is received in a setting period of a power saving state where power consumption is lower than in a running state, returning to the running state to process the signal and provide a service corresponding to the signal;

reading a content of the provided service correlated with a content of a request requested by the signal from a memory; and providing the service corresponding to the content of the service to the external device, when the received request in the setting period of the power saving state matches the content of the request stored in the memory, wherein when transitioning to the power saving state, forwarding, to an external storage device, the stored content of the service and the content of the request correlated with the content of the service.

8. A non-transitory computer readable medium storing a program causing a computer to execute a process for processing information, the process comprising:

receiving, from an external device via a communication line, a signal requesting provision of various types of services;

when the signal is received in a setting period of a power saving state where power consumption is lower than in a running state, returning to the running state to process the signal and provide a service corresponding to the signal;

reading a content of the provided service correlated with a content of a request requested by the signal from a memory; and providing the service corresponding to the content of the service to the external device, when the received request in the setting period of the power saving state matches the content of the request stored in the memory, wherein the content of the provided service is correlated with either one or both of a number of times of provision of the service and a date and time of provision of the service.

9. The non-transitory computer readable medium according to claim 8, wherein on the basis of either one or both of the number of times of provision and the date and time of provision of the service, erasing the stored content of the service.

10. A non-transitory computer readable medium storing a program causing a computer to execute a process for processing information, the process comprising:

receiving, from an external device via a communication line, a signal requesting provision of various types of services;

when the signal is received in a setting period of a power saving state where power consumption is lower than in a running state, returning to the running state to process the signal and provide a service corresponding to the signal;

reading a content of the provided service correlated with a content of a request requested by the signal from a memory; and providing the service corresponding to the content of the service to the external device, when the received request in the setting period of the power saving state matches the content of the request stored in the memory, wherein when transitioning to the power saving state, forwarding, to an external storage device, the stored content of the service and the content of the request correlated with the content of the service.

* * * * *